(12) United States Patent
Pedrini (10) Patent No.: US 9,649,986 B2
(45) Date of Patent: May 16, 2017

(54) WHEEL CLAMPING BICYCLE CARRIER

(71) Applicant: Fabio Pedrini, Bologna (IT)

(72) Inventor: Fabio Pedrini, Bologna (IT)

( * ) Notice: Subject to any disclaimer, the term of this patent is extended or adjusted under 35 U.S.C. 154(b) by 270 days.

(21) Appl. No.: 14/487,651

(22) Filed: Sep. 16, 2014

(65) Prior Publication Data

US 2015/0076200 A1 Mar. 19, 2015

Related U.S. Application Data

(60) Provisional application No. 61/878,755, filed on Sep. 17, 2013.

(51) Int. Cl.
*B60R 9/00* (2006.01)
*B60R 11/00* (2006.01)
*B60R 9/10* (2006.01)
*B60R 9/06* (2006.01)

(52) U.S. Cl.
CPC . *B60R 9/10* (2013.01); *B60R 9/06* (2013.01)

(58) Field of Classification Search
CPC .... B66D 5/24; B66D 1/04; B60R 9/06; B60R 9/10
USPC .................................. 224/519, 497; 70/233
See application file for complete search history.

(56) References Cited

U.S. PATENT DOCUMENTS

| | | |
|---|---|---|
| 488,395 A | 12/1892 | Justice |
| 529,827 A | 11/1894 | Fonda |
| 556,789 A | 3/1896 | Walker |
| 576,351 A | 2/1897 | Penfield |
| 586,681 A | 7/1897 | Douglas |
| 607,024 A | 7/1898 | Durfee et al. |
| 615,264 A | 12/1898 | Du Pont |
| 623,807 A | 4/1899 | Myers |
| 1,179,823 A | 4/1916 | Greene |
| 1,912,958 A | 6/1933 | Widener |
| 1,977,734 A | 10/1934 | Monckmeier |
| 2,179,163 A | 11/1939 | Roth |
| 3,251,520 A | 5/1966 | Van Dyke et al. |
| 3,529,737 A | 9/1970 | Daugherty |
| 3,744,689 A | 7/1973 | Kjensmo |
| 3,891,132 A | 6/1975 | Chandler |
| 3,972,456 A | 8/1976 | Saffold |
| 3,993,229 A | 11/1976 | Summers |
| 4,088,253 A | 5/1978 | Saffold |
| 4,125,214 A | 11/1978 | Penn |
| 4,171,077 A | 10/1979 | Richard, Jr. |
| 4,213,729 A | 7/1980 | Cowles et al. |
| 4,360,135 A | 11/1982 | Goble |
| 4,400,129 A | 8/1983 | Eisenberg et al. |
| 4,403,716 A | 9/1983 | Carlson et al. |
| 4,437,597 A | 3/1984 | Doyle |
| 4,875,608 A | 10/1989 | Graber |
| 5,065,603 A * | 11/1991 | Kloke .................. B62H 5/003 156/60 |
| 5,169,044 A | 12/1992 | Englander |

(Continued)

FOREIGN PATENT DOCUMENTS

| | | |
|---|---|---|
| DE | 4330019 | 3/1995 |
| DE | 19934384 | 1/2001 |

*Primary Examiner* — Nathan J Newhouse
*Assistant Examiner* — Lester L Vanterpool
(74) *Attorney, Agent, or Firm* — Boyle Fredrickson, S.C.

(57) ABSTRACT

A bicycle carrier that allows for carrying at least one bicycle on a motor vehicle by holding the bicycle(s) at its wheels only, without touching the frame of the bicycle(s).

27 Claims, 9 Drawing Sheets

(56) References Cited

U.S. PATENT DOCUMENTS

| | | |
|---|---|---|
| 5,570,825 A | 11/1996 | Cona |
| 5,709,521 A | 1/1998 | Glass et al. |
| 6,019,266 A | 2/2000 | Johnson |
| 6,123,498 A | 9/2000 | Surkin |
| 6,149,039 A | 11/2000 | Englander |
| 6,491,195 B1 | 12/2002 | McLemore et al. |
| 6,523,731 B1 | 2/2003 | Pedrini |
| 6,761,297 B1 | 7/2004 | Pedrini |
| 6,857,545 B2 | 2/2005 | McLemore et al. |
| 7,044,347 B1 | 5/2006 | Pedrini |
| 7,222,763 B2 | 5/2007 | Pedrini |
| 7,240,816 B2 | 7/2007 | Tsai |
| 7,481,344 B2 * | 1/2009 | Naslund ................. B60R 9/048 224/319 |
| 7,648,151 B2 | 1/2010 | Pedrini |
| 7,661,280 B1 * | 2/2010 | Weyland ................ B62H 5/003 224/425 |
| 8,113,398 B2 * | 2/2012 | Sautter ..................... B60R 9/06 224/497 |
| 2005/0061842 A1 * | 3/2005 | Tsai .......................... B60R 9/06 224/501 |
| 2005/0284905 A1 | 12/2005 | Naslund et al. |
| 2007/0108245 A1 | 5/2007 | Ferman et al. |
| 2008/0099522 A1 | 5/2008 | Clausen et al. |
| 2008/0230579 A1 * | 9/2008 | Wang ....................... B60R 9/10 224/400 |
| 2009/0120981 A1 * | 5/2009 | Sautter ..................... B60R 9/08 224/316 |
| 2009/0120984 A1 * | 5/2009 | Sautter ..................... B60R 9/10 224/497 |
| 2009/0236382 A1 * | 9/2009 | Sautter ..................... B60R 9/10 224/497 |
| 2010/0320247 A1 * | 12/2010 | Wang ....................... B60R 9/10 224/567 |
| 2013/0022440 A1 * | 1/2013 | Sautter ..................... B60R 9/10 414/800 |
| 2013/0062383 A1 * | 3/2013 | Jeli .......................... B60R 9/10 224/497 |
| 2013/0062385 A1 | 3/2013 | Pedrini |

* cited by examiner

WHEEL CLAMPING BICYCLE CARRIER

CROSS-REFERENCE TO RELATED APPLICATION

This application claims priority from U.S. Provisional Patent Application No. 61/878,755, which was filed on Sep. 17, 2013, the subject matter of which is incorporated herein by reference in its entirety.

BACKGROUND OF THE INVENTION

1. Field of the Invention

The present invention relates to bicycle carriers and, more particularly, to a bicycle carrier that can support a bicycle(s) by its wheels.

2. Discussion of the Related Art

Vehicle mounted bicycle carriers are known. Some bicycle carriers support the bicycles substantially at their wheels. These known bicycle carriers typically require the bicycle carriers to engage components of the bicycles other than the wheels for stabilization.

SUMMARY OF THE INVENTION

The present invention is directed to a bicycle carrier that allows for carrying at least one bicycle on a motor vehicle by holding the bicycle(s) at its wheels only, and more specifically by holding the bicycles by engaging the tires mounted to the wheels, without touching the frame of the bicycle(s) and without touching the areas of the wheels inwardly of the tires. The bicycle carrier includes retaining arms pivotally connected to a main bar that supports wheel supports configured to receive bicycle wheels. Hooks are movably mounted on the retaining arms to engage the bicycle wheels on the tires, to capture and retain the bicycle wheels between the hooks and wheel supports that are supported by the main bar of the bicycle carrier, allowing the bicycle(s) to be carried only by the bicycle wheels, without load-bearing restraint contact between the bicycle carrier and other components of the bicycle(s), including the portions of the wheels located inwardly of the tires. The retaining arm and hooks can be configured for free movement in unrestricted movement directions and locked against movement in opposite restricted movement directions. This facilitates moving the retaining arms and hooks to provide an open or bicycle receiving configuration of the bicycle carrier and locking the hooks against the bicycle wheels by closing the retaining arms and hooks by pivoting and sliding, which may be done without requiring additional manipulation of restraint hardware at the retaining anus or hooks. In this way, bicycle(s) can be quickly secured in the bicycle carrier without tools by merely pushing components or portions of the retaining arms and hooks while ensuring that bicycle components other than the bicycle wheels are free of contact from other structures, which reduces the likelihood of scratching or otherwise damaging such other bicycle components.

According to one aspect of the invention, a bicycle carrier is provided for carrying at least one bicycle on a motor vehicle. The bicycle carrier has a main bar having first and second ends. A wheel support is arranged with respect to the main bar to support a wheel of a bicycle. A retaining arm is configured for retaining the wheel of the bicycle in a fixed position relative to the wheel support. The retaining arm has a first end defining a pivot axis of the retaining arm and a second end arranged to move with respect to the main bar to engage the wheel of the bicycle for retaining the wheel of the bicycle in a fixed position. An arm locking arrangement is arranged at the first end of the retaining arm and configured to allow free movement of the retaining arm in a first direction of travel about the pivot axis. The first direction of travel of the retaining arm defines an unrestricted movement direction. The arm locking arrangement restricts movement of the retaining arm in a second, opposite direction of travel about the pivot axis, defining a restricted movement direction.

According to another aspect of the invention, the arm locking arrangement may be configured to lock the retaining arm into multiple locked positions corresponding to positions defined by the retaining will when the retaining arm stops movement in the unrestricted movement direction. The unrestricted movement direction may be defined by movement of the second end of the retaining win toward an intermediate section of the main bar. The restricted movement direction may be defined by movement of the second end of the retaining arm away from an intermediate section of the main bar. The arm locking arrangement may include a one-way mechanism configured to allow movement of the retaining arm in the unrestricted movement direction and prevent movement of the retaining arm in the restricted movement direction. The arm locking arrangement may include a release mechanism configured to release the one-way mechanism for allowing movement of the retaining arm in the restricted movement direction. The one-way mechanism may include a ratchet arrangement. The ratchet arrangement may include a toothed surface and a stop that includes an end configured to advance across the toothed surface when the retaining arm is moved in the unrestricted movement direction and to lock against the toothed surface to prevent movement of the retaining arm in the restricted movement direction. The release mechanism may be arranged with respect to the stop for moving the stop to disengage from the toothed surface of the ratchet arrangement. The release mechanism may include a button. The button may be arranged at the second end of the retaining arm. The release mechanism may include a link that interconnects the button and the stop.

According to another aspect of the invention, the wheel support may define a wheel support of a first pair of aligned wheel supports arranged at a first side of the bicycle carrier. A second pair of aligned wheel supports may be arranged at a second side of the bicycle carrier. The retaining arm may define a first retaining man arranged at a first end of the bicycle carrier and a second retaining arm may be arranged at a second end of the bicycle carrier. Each of the first and second retaining arms may be configured to engage respective wheels of bicycles supported by the first and second pans of aligned wheel supports on the first and second sides of the bicycle carrier, respectively. Each of the first and second retaining arms may include a first hook extending in the direction of the first side of the bicycle carrier and a second hook extending in the direction of the second side of the bicycle carrier.

According to another aspect of the invention, a height adjustment arrangement may be arranged with respect to each of the first and second hooks of each of the first and second arm locking arrangements. The height adjustment arrangement is configured for selectively adjusting a position of the corresponding hook relative to the respective one of the first and second arm locking arrangements. On each of the first and second arm locking arrangements, the first and second hooks may be configured for height adjustment independent of one another. The first arm locking arrangement may be supported by a first bracket at the first end of the bicycle carrier and arranged between respective wheel supports of the first and second pairs of wheel supports at the first end of the bicycle carrier.

According to another aspect of the invention, the bicycle carrier includes a bicycle lock arrangement configured for locking a bicycle to the bicycle carrier. The bicycle lock arrangement has a cable arrangement configured for storage with respect to the main bar. A lock mechanism of the bicycle lock arrangement is configured to selectively lock segments of the cable, arrangement to each other. A lock enclosure may be arranged at at least one of the first and second ends of the main bar and configured for storing the lock mechanism with respect to the main bar. The cable arrangement and the lock mechanism may be configured for storage inside of the main bar. The bicycle lock arrangement may include a lock release arrangement configured to selectively permit withdrawal of at least a portion of the cable arrangement from storage inside of the main bar. At least a portion of the cable arrangement, such as a cable segment, may be withdrawn from storage inside of the main bar by removal through at least one of the first and second ends of the main bar. The lock mechanism may be arranged with respect to the cable segment for removing the lock mechanism from the lock enclosure by moving in unison with the at least a portion of the cable segment during removal of the at least a portion of the cable segment out of the at least one of the first and second ends of the main bar.

According to another aspect of the invention, the lock release arrangement may include a gate configured to engage an outer surface of the cable segment to prevent removal of the lock mechanism and the at least a portion of the cable segment from storage inside of the main bar. The gate may define a resting state in which the gate is biased against the outer surface of the cable segment. The lock release arrangement may include an actuator, such as, a button arranged with respect to the gate for moving the gate to disengage the outer surface of the cable segment for allowing removal of the lock mechanism and the at least a portion of the cable segment from storage inside of the main bar. The lock enclosure may include a socket and the lock mechanism is configured to nest within the socket of the lock enclosure in a stored position of the lock mechanism.

The lock enclosure may define a first passage through which a first cable segment extends to longitudinally advance during withdrawal of the at least a portion of the first cable segment from storage inside of the main bar and a second passage through which a second cable segment extends to longitudinally advance during withdrawal of the at least a portion of the second cable segment from storage inside of the main bar.

These and other features and aspects of the present invention will be better appreciated and understood when considered in conjunction with the following description and the accompanying drawings It should be understood, however, that the following description, while indicating a representative embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

DETAILED DESCRIPTION OF THE INVENTION

Figure 1:
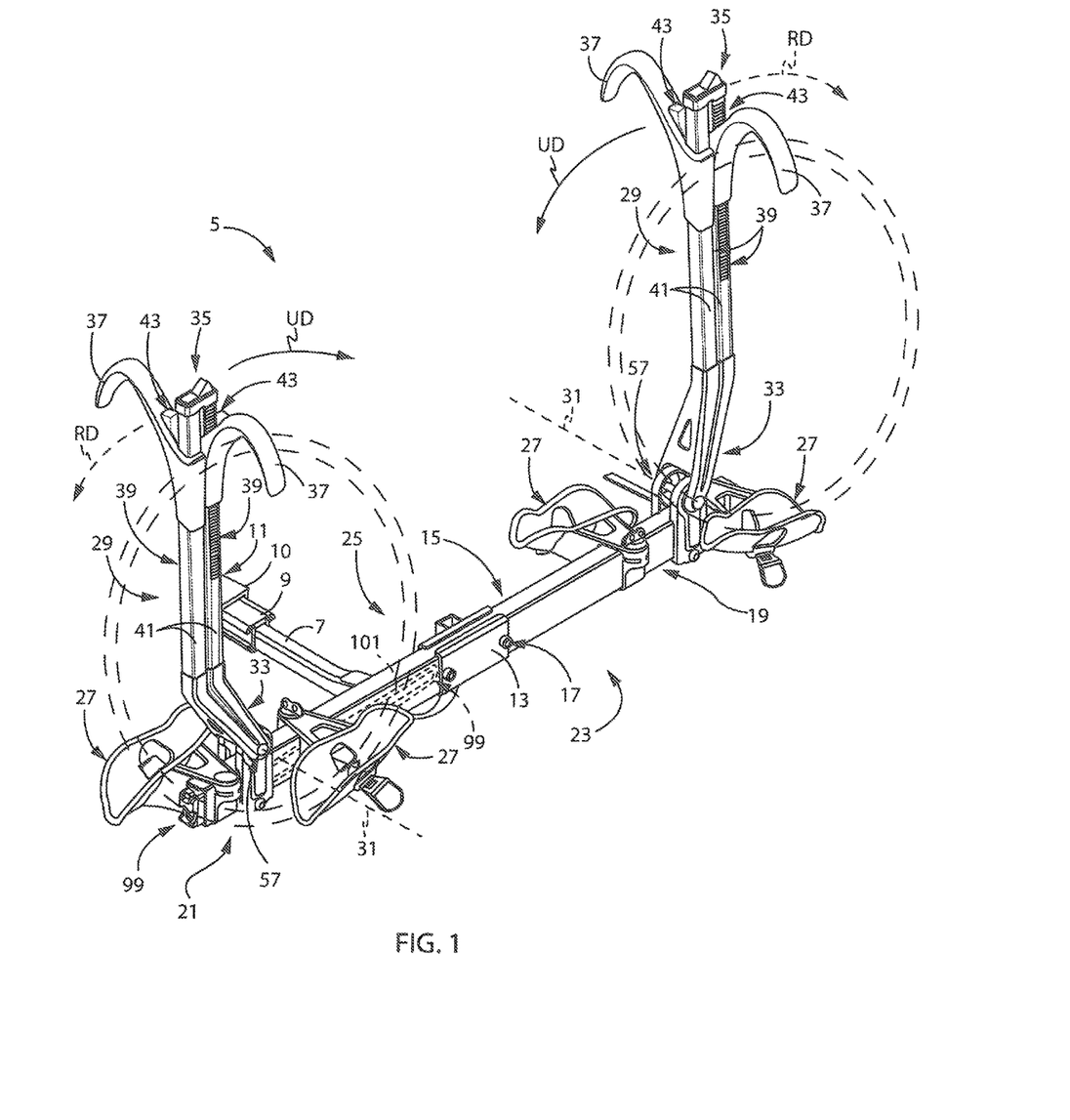
FIG. 1 is a front side perspective view of a bicycle carrier in accordance with the present invention, showing the carrier arms in an extended, operative position.

Specific embodiments of the present invention will be described by the following non-limiting examples which will serve to illustrate various features of the invention. With reference to the drawing figures in which like reference numerals designate like parts throughout the disclosure, FIG. 1 shows a representative embodiment of the present invention as a bicycle carrier 5 that allows for carrying at least one bicycle on a motor vehicle by holding the bicycle (s) at its wheels only, and specifically at the tires mounted to the wheels, without touching the frame of the bicycle(s) and without touching the portions of the wheels located inwardly of the tires. Although the bicycle carrier 5 is shown configured for carrying two bicycles, it is understood that the bicycle carrier 5 may be configured for carrying a single bicycle, or more than two bicycles. This may be done by, for example, arranging fewer of the various components shown for accommodating and securely carrying a single bicycle with the bicycle carrier 5. Bicycle carrier 5 can be configured to carry more than two bicycles by arranging more of the various components shown for accommodating and securely carrying bicycles with the bicycle carrier 5, such as by transversely or longitudinally aligned multiple sets of the components to accommodate carrying more than two bicycles, with the number of the multiple sets of components within the bicycle carrier 5 corresponding to the number of bicycles carried by bicycle carrier 5.

Referring now to FIG. 1, bicycle carrier 5 includes a receiver bar 7 that may include a receiver adapter 9 that inserts into a receiver 10 of a hitch 11 of the motor vehicle (not shown), in a manner as is known. A bracket 13 interconnects the receiver bar 7 to a main bar 15 at an intermediate portion 17 of the main bar 15. The main bar 15 defines first and second ends 19, 21 on opposing sides of the intermediate portion 17. First and second sides 23, 25 of the bicycle carrier 5 are defined on opposing sides of a longitudinal axis along which the main bar 15 extends. At least one wheel support 27 is arranged with respect to the main bar 15 to support a wheel of a bicycle. As shown in this embodiment, a first pair of wheel supports 27 that are aligned with each other is arranged at the first side 23 of the bicycle carrier 5. A second pair of wheel supports 27 that are aligned with each other is arranged at the second side 25 of the bicycle carrier 5. As shown, each wheel support 27 defines a cradle-type form that is configured to receive and support a bicycle wheel from below by engaging a lowermost surface of the wheel, specifically be engaging the tire that is secured to the wheel. In one embodiment, the wheel supports 27 may be those described as supporting element(s) disclosed in the commonly owned U.S. application Ser. No. 13/586,194, published as U.S. Pub. No. 2013/0062385, although it is understood that the wheel support may include other configurations.

Still referring to FIG. 1, a retaining arm 29 is arranged at each of the first and second ends 19,21 of the bicycle carrier 5. Each retaining arm 29 is configured to move about a pivot axis 31 freely in a first direction, such as toward the intermediate portion 17, and to prevent movement about the pivot axis 31 in a second direction, such as away from the intermediate portion 17, which is described in greater detail elsewhere herein. The pivot axis 31 is defined at a first end 33 of the retaining arm 29. A second end 35 is arranged opposite the pivot axis 31 of the retaining arm 29. Each retaining arm 29 includes a pair of hooks 37, with one hook 37 extending in the direction of the first side 23 and the other hook 37 extending in the direction of the second side 25 of the bicycle carrier 5. Within each retaining arm 29, each hook 37 is arranged to move along a track 39 on a pair of posts 41 independently of the other hook 37 on the same retaining arm 29. This may accommodate securing bicycles with different size wheels into the respective wheel supports 27 on the first and second sides 23, 25 of the bicycle carrier 5.

Figure 2:
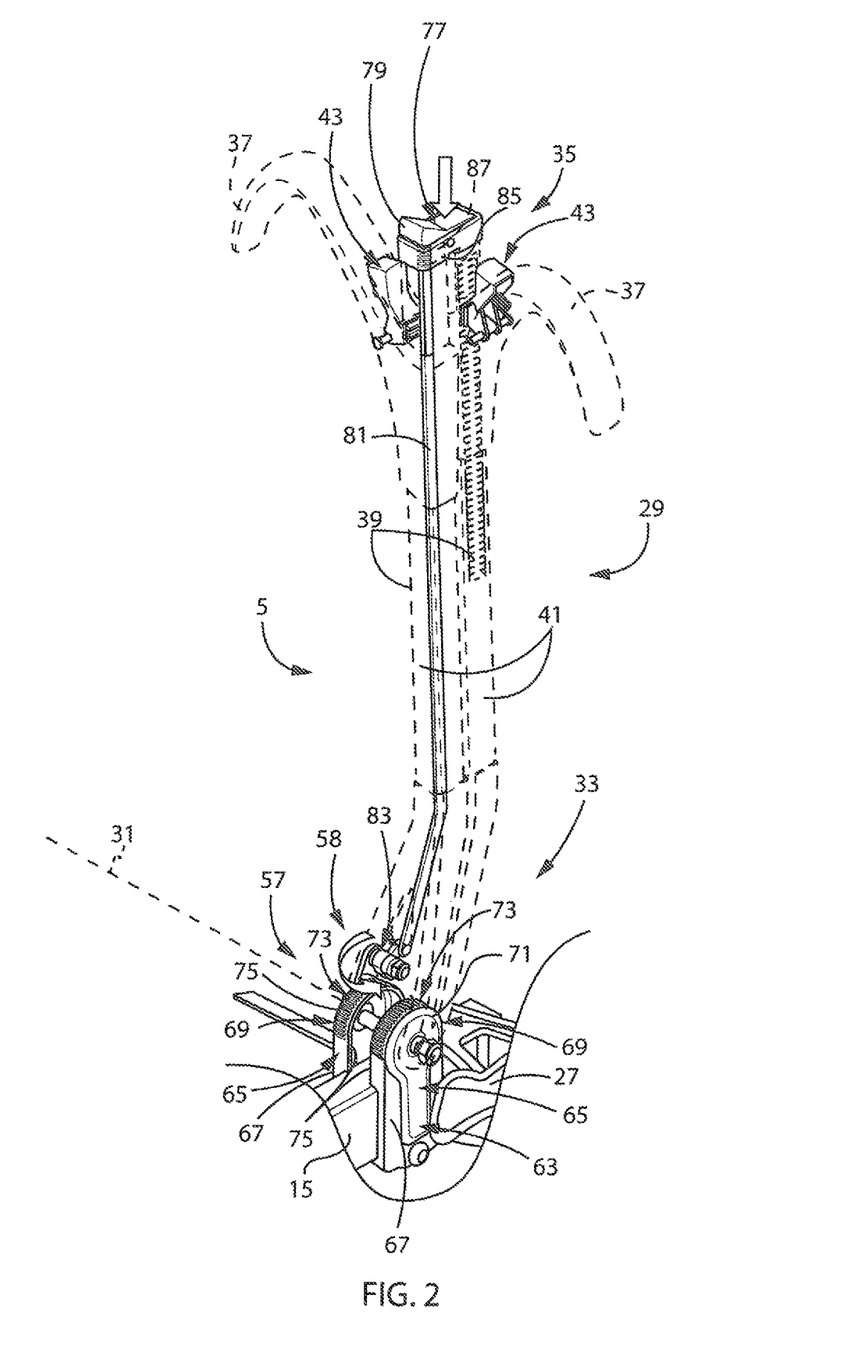
FIG. 2 is a front side perspective view of a portion of the bicycle carrier as shown in FIG. 1.
Figure 3:
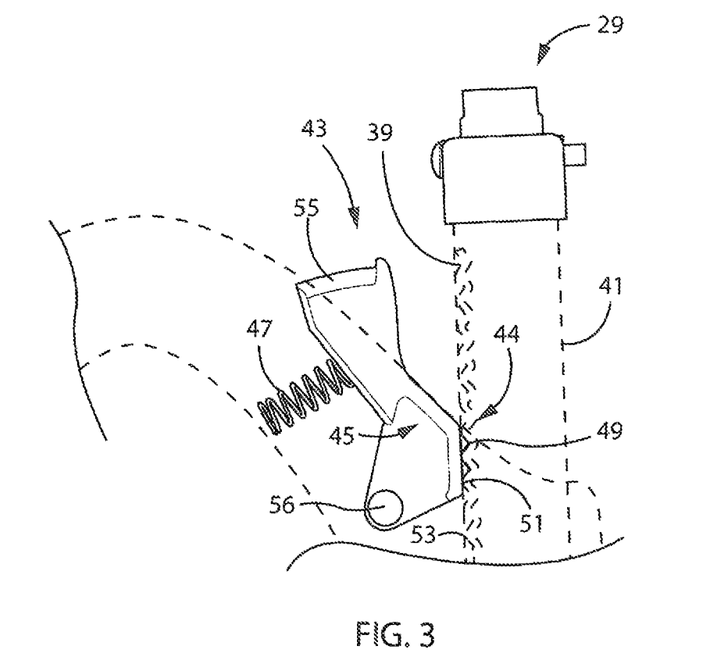
FIG. 3 is a partially schematic side elevation view of a height adjustment arrangement of the bicycle carrier as shown in FIG. 1.
Figure 4:
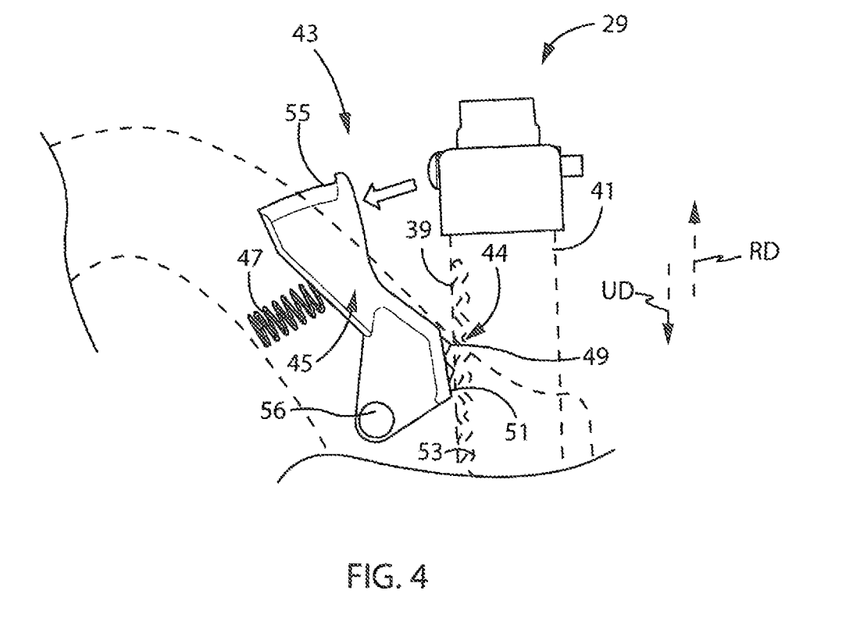
FIG. 4 is another partially schematic side elevation view of the height adjustment arrangement as shown in FIG. 3.

Referring now to FIGS. 2, 3, and 4, each hook 37 includes a height adjustment arrangement 43. Height adjustment arrangement 43 is configured to allow adjustment of a position of the hook 37 along the length of the post 41 and, therefore, toward or away from the respective wheel support 27. Each hook 37 is configured to move longitudinally along the arm 29 freely in a first direction, such as toward the main bar 15 and wheel support 27 and to prevent movement longitudinally along the arm 29 in a second direction, such as away from the main bar 15 and wheel support 27, which is described in greater detail elsewhere herein.

Referring now to FIGS. 3 and 4, in this configuration, the height adjustment arrangement 43 is configured to allow free movement of the hook 37 in an unrestricted movement direction which is represented by a solid straight arrow UD (FIG. 4) and to restrict movement in the opposite direction to define a restricted movement direction, which is represented by a dashed straight arrow RD (FIG. 4). As shown, the height adjustment arrangement 43 is configured as a one-way mechanism for allowing movement of the hook 37 in the unrestricted movement direction UD, such as a ratchet arrangement 44, while selectively permitting movement in the restricted movement direction RD while requiring a user to manipulate the height adjustment arrangement 43 to release the restriction against movement in the restricted movement direction RD.

Still referring to FIGS. 3 and 4, the ratchet arrangement 44 of the height adjustment arrangement 43 includes a lever 45 that is biased by a spring 47 to lock teeth 49 of a face 51 of the lever 45 into teeth 53 of the track 39. Each of the teeth 49 and 53 can be generally triangular in cross-section, with each tooth 49, 53 defining first and second surfaces such as lower and upper surfaces that connect at an outermost tip or apex to define the triangular cross-section. Generally V-shaped grooves are defined between adjacent pairs of the teeth 49 of the lever 45 and between the teeth 53 of the track 39. An actuator, in the form of a button 55, is arranged at an end of the lever 45 for releasing the teeth 49 of the lever face 51 from the teeth 53 of the track 39 by pivoting the lever 45 about a pin 56. In this way, the hook 37 can be height adjusted by pushing the button 55, moving the hook 37 to a new position, and automatically locking the hook 37 in the new position by releasing the button 55. Furthermore, as shown in this embodiment, the height adjustment arrangement 43 is configured to allow the hook 37 to freely move downwardly along the arm 29, closer to the respective wheel support 27 and prevent movement of the hook 37 upwardly along the arm 29, further away from the respective wheel support 27, without pressing the button 55. That is because the pin 56 and thus the pivot axis of the lever 45 defined by the pin 56 is arranged at a lower height than a location of the interfacing surfaces of teeth 49 of the lever 45 and teeth 53 of the track 39 of the post 41.

Still referring to FIGS. 3 and 4, in this configuration, without pushing the button 55, moving the hook 37 downwardly along the arm 29 automatically deflects the lever 45 away from the post 41 toward the position of the lever 45 shown in FIG. 4. This compresses the spring 47 when lower surfaces of the teeth 49 of the lever 45 slide across and over upper surfaces of the teeth 53 of the track 39. The sliding of the teeth 49 across teeth 53 and deflection of the lever 45 occurs until apexes or outermost tips of the teeth 49 and 53 pass each other, at which point the compressed spring 47 biases the teeth 49 into respective grooves between the next encountered teeth 53 of the track 39, clicking the teeth 49 and 53 into an intermeshing relationship with each other. However, the hook 37 is automatically self-stable and locked against movement away from the main bar 15 and respective wheel support 27. Without pushing the button 55, trying to move the hook 37 up at along the arm 29 jams and locks the lever 45 with respect to the post 41 in the position of the intermeshed engagement of the teeth 49 of the lever 45 with the teeth 53 of the track 39 in the position shown in FIG. 3. While trying to move the hook 37 upwardly along the arm 29 without pushing the button 55, upper surfaces of the teeth 49 engage and try to slide across the lower surfaces of teeth 53 of the track 39, which tends to pivot the lever 45 about the pin 56 and urges the teeth 49 deeper into the grooves between the teeth 53 of the track 39, preventing movement of the hook 37 in the restricted movement direction RD. This provides self-locking one-way movement of the hook 37 while moving the hook 37 toward a wheel/tire of a bicycle to restrain the wheel/tire of the bicycle between the hook 37 and the wheel support 27. In this way, multiple locked positions of the hook 37 can be automatically achieved by moving the hook 37 in the unrestricted movement direction LTD (FIG. 4) toward the wheel support 27 (FIG. 1) at each location the hook 37 is in when the hook 37 stops moving. In each of the multiple locked positions, the hook 37 is not able to move in the restricted movement direction RD (FIG. 4), away from the wheel support 27 (FIG. 1), without pushing the button 55 or otherwise actuating the lever 45 of the height adjustment arrangement 43.

Referring now to FIGS. 1 and 2, an arm locking arrangement 57 is arranged at the first end 33 of each retaining arm 29. The arm locking arrangement 57 is configured to allow free movement of the retaining arm 29 toward the intermediate portion 17 to define an unrestricted movement direction which is represented by a solid curved arrow(s) UD and to restrict movement in the opposite direction to define a restricted movement direction, which is represented by a dashed curved arrow(s) RD in FIG. 1.

Referring now to FIG. 2, the arm locking arrangement 57 is shown configured as a one-way mechanism for allowing movement of the retaining arm 29 in the unrestricted movement direction UD, such as a ratchet arrangement 58, while selectively permitting movement in the restricted movement direction RD while requiring a user to manipulate the arm locking arrangement 57 to overcome the restriction against movement in the restricted movement direction RD. The ratchet arrangement 58 includes a bracket 63 defined by a pair of plates 65, each having a lower end 67 that engages the main bar 15. Upper ends 69 of the plates 65 have lobes 71 with arcuate upper surfaces that define toothed surfaces 73 having teeth 75. A release mechanism 77 is configured to release the one-way action of the ratchet arrangement 58 for allowing movement of the retaining arm 29 in the restricted movement direction RD (FIG. 1). The release mechanism 77 includes a button 79 arranged to actuate a link 81 that is operably connected to a stop 83 that selectively engages the toothed surface 73 of the lobe 71. The button 79 is biased by a spring 85 away from a spring support 87 so that, in a resting state, the button 79 is pushed into an extended position, as shown in FIG. 2, which pulls upwardly on the link 81 and pushes the stop 83 into the tooth surface 73.

Figure 5:
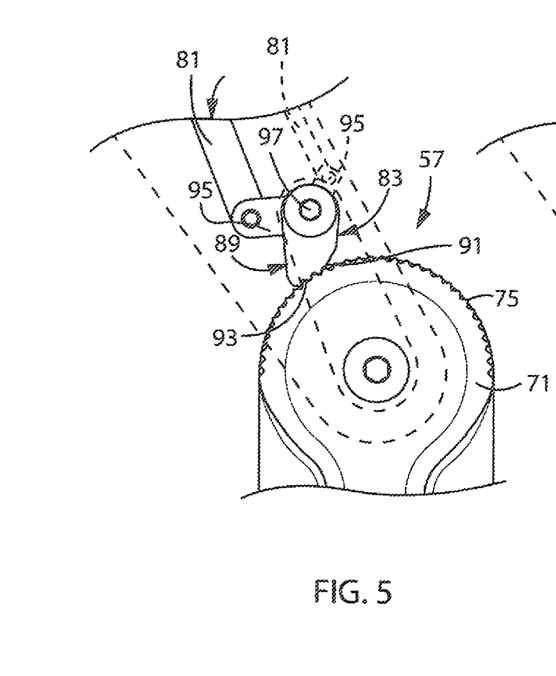
FIG. 5 is a partially schematic side elevation view of an arm locking arrangement of the bicycle carrier as shown in FIG. 1.
Figure 6:
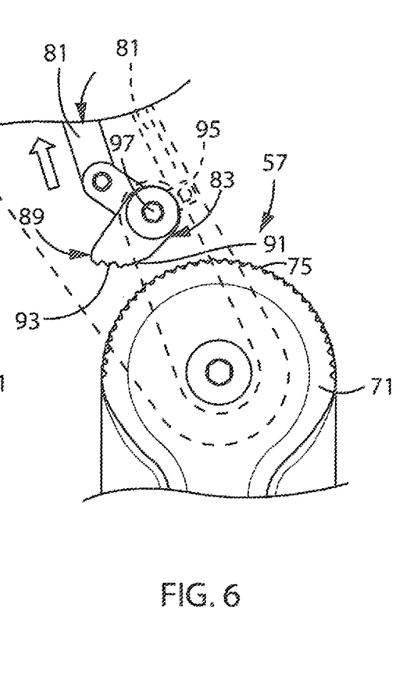
FIG. 6 is another partially schematic side elevation view of an arm locking arrangement as shown in FIG. 5.
Figure 7:
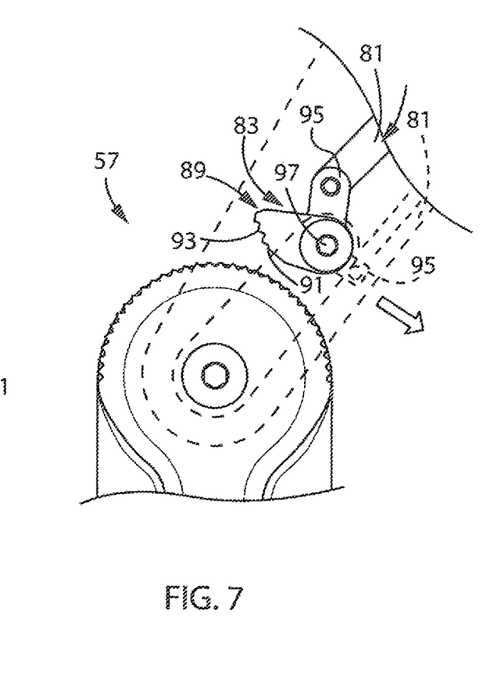
FIG. 7 is another partially schematic side elevation view of an arm locking arrangement as shown in FIG. 5.
Figure 8:
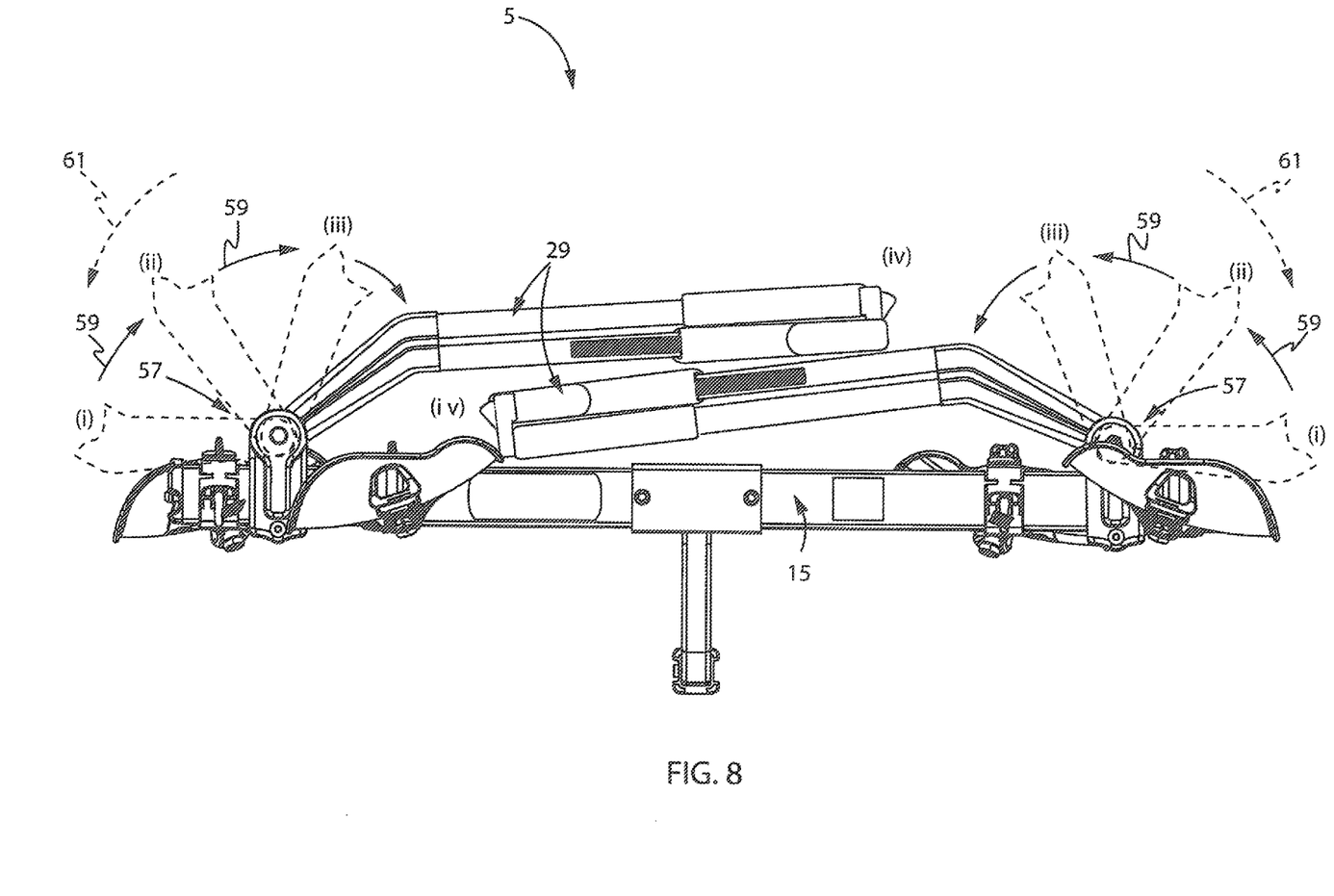
FIG. 8 is front elevation view of the bicycle carrier as shown in FIG. 1, showing the arms in a folded, inoperative position.

Referring now to FIGS. 5-7, the stop 83 has an end 89 with a sloped wall 91 having teeth 93 that engage the teeth 75 of the lobe 71. Each of the teeth 75 and 93 can be generally triangular in cross-section, with each tooth 75, 93 defining first and second surfaces such as inwardly facing and outwardly facing surfaces that connect at an outermost tip or apex to define the triangular cross section. Generally V-shaped grooves are defined between adjacent pairs of the teeth 75 of the lobe 71 and between the teeth 93 of the stop 83. A pivot arm 95 is connected to the link 81 and arranged to move the stop 83 about a pin 97. The pivot arm 95 and link 81 shown in dashed outline show a configuration in which the link 81 is pulled upwardly in a resting state to hold the stop 83 against the lobe 71. The pivot 95 and link 81 shown in solid outline show a configuration in which the link 81 is pushed downwardly in a resting state to hold the stop 83 against the lobe 71. Regardless, the arm locking arrangement 57 and release mechanism 77 are arranged with respect to each other to allow free movement of the retaining arm 29 in the unrestricted movement direction UD (FIG. 1) and prevent movement of the retaining arm 29 in the restricted movement direction RD, unless the release mechanism 77 is actuated, whereby the retaining arm 29 is automatically self-stable and locked against movement away from the main bar 15. Without actuating the release mechanism 77, moving the retaining arm 29 to fold the retaining arm 29 toward the intermediate portion 17 of the main bar 15 (FIG. 1) automatically deflects the stop 83 away from the lobe 71. This pulls the link 81 and the button 79 downwardly, which compresses the spring 85 when surfaces of the teeth 93 of the stop 83 slide across respective surfaces of the teeth 75 of the lobe 71. The sliding of the teeth 93 across teeth 75 and deflection of the stop 83 occur until apexes or outermost tips of the teeth 93 and 75 pass each other, at which point the compressed spring 85 pushes the link 81 which biases the stop 83 and thus the teeth 93 into respective grooves between the next encountered teeth 75 of the lobe 71, clicking the teeth 93 and 75 into intermeshing relationship with each other. However, the retaining arm 29 is automatically self-stable and locked against movement away from the intermediate portion 17 of the main bar 15 (FIG. 1). Without actuating the release mechanism 77, trying to move the retaining arm 29 outwardly or away from the intermediate portion 17 of the main bar 15 (FIG. 1) jams and locks the retaining arm 29 with respect to the main bar 15 in the position of the intermeshed engagement of the teeth 93 of the stop 83 with the teeth 75 of the lobe 71 in the position shown in FIG. 5. While trying to move the retaining arm 29 without actuating the release mechanism 77, engagement of respective surfaces of the teeth 93, 75 trying to slide across each other tends to pivot the stop about the pin 97 and urges the teeth 93 deeper into the grooves between the teeth 75 of the lobe 71, preventing movement of the retaining arm 29 in the restricted movement direction RD. This provides self-locking one-way movement of the retaining arm 29 while moving the retaining arm 29 toward a wheel/tire of a bicycle to restrain the wheel/tire of the bicycle between the hook 37 and the wheel support 27. In this way, multiple locked positions of the retaining arm 29 can be automatically achieved by moving the retaining arm 29 in the unrestricted movement direction UD at each location the retaining arm is in when the retaining arm 29 stops moving. In each of the multiple locked positions, the retaining arm 29 is not able to move in the restricted movement direction RD without pushing the button 79 or otherwise actuating the release mechanism 77, FIG. 8 shows a schematic representation of moving the retaining arms 29 in the unrestricted movement direction UD and stopping at different positions to define locked positions (i), (ii), (iii), (iv), at which the retaining arms 29 require actuation of the release mechanism 77 to move in the restricted movement direction RD.

Figure 9A:
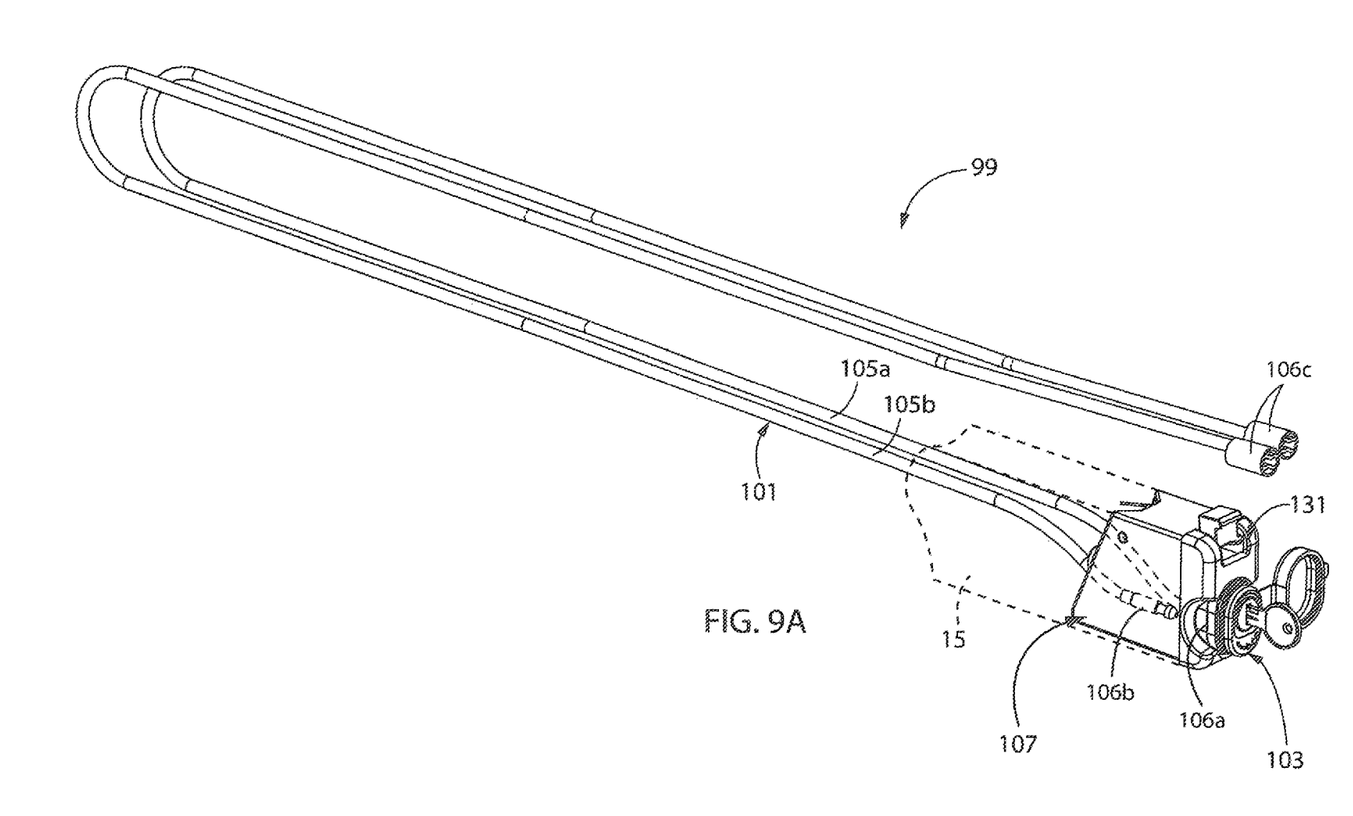
FIG. 9A is a partial front side perspective view of a bicycle lock arrangement incorporated in the bicycle carrier as shown in FIG. 1.
Figure 9B:
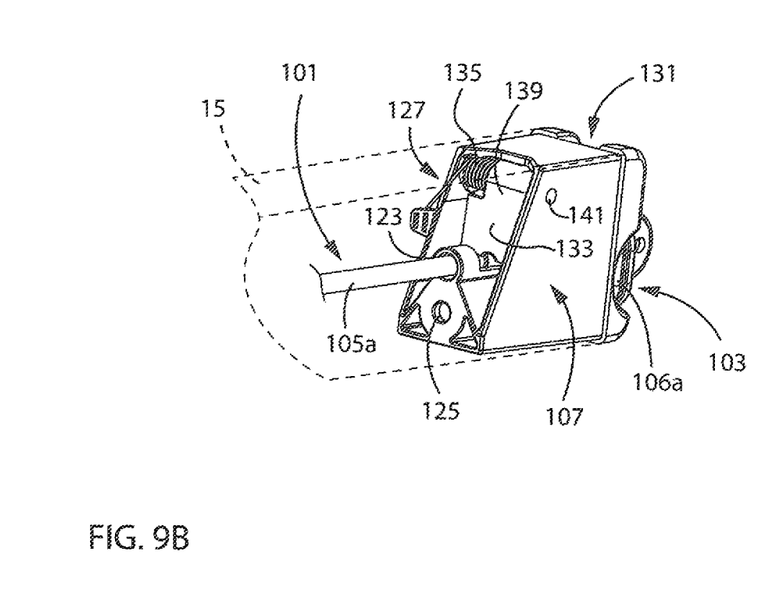
FIG. 9B is a partial front side perspective view of a variant of the bicycle lock arrangement of FIG. 9A.

Referring now to FIGS. 1, 9A, and 9B, the bicycle carrier 5 includes a bicycle lock arrangement 99 that is configured for locking a bicycle to the bicycle carrier 5. The bicycle lock arrangement 99 includes a cable arrangement 101 configured for storage with respect to the main bar 15. Referring now to FIG. 9A, the bicycle lock arrangement 99 includes a lock mechanism 103 that is configured to selectively lock cable segments 105a, 105b of the cable arrangement 101 to each other by a lock body 106a with a bore configured to receive a cable pin 106b. The lock mechanism 103, lock body 106a, and cable pin 106b of the bicycle lock arrangement 99 can be the same as those of—Model No. 981—locking cable 8' available from Saris Cycle Racks of the Saris Cycling Group of Madison, Wis. The lock body 106a is mounted to a first end of cable segment 105a and the cable pin 106b is mounted to a first end of the cable segment 105b. Caps 106c are mounted to second ends of the cable segments 105a, 105b, opposite the lock body 106a and cable pin 106b. A lock enclosure 107 is arranged at an end of the main bar 15 for storing the lock body 106a and cable pin 106b with respect to the main bar 15 while storing the cable segments 105a, 105b inside the main bar 15, inwardly of the lock enclosure.

Figure 10:
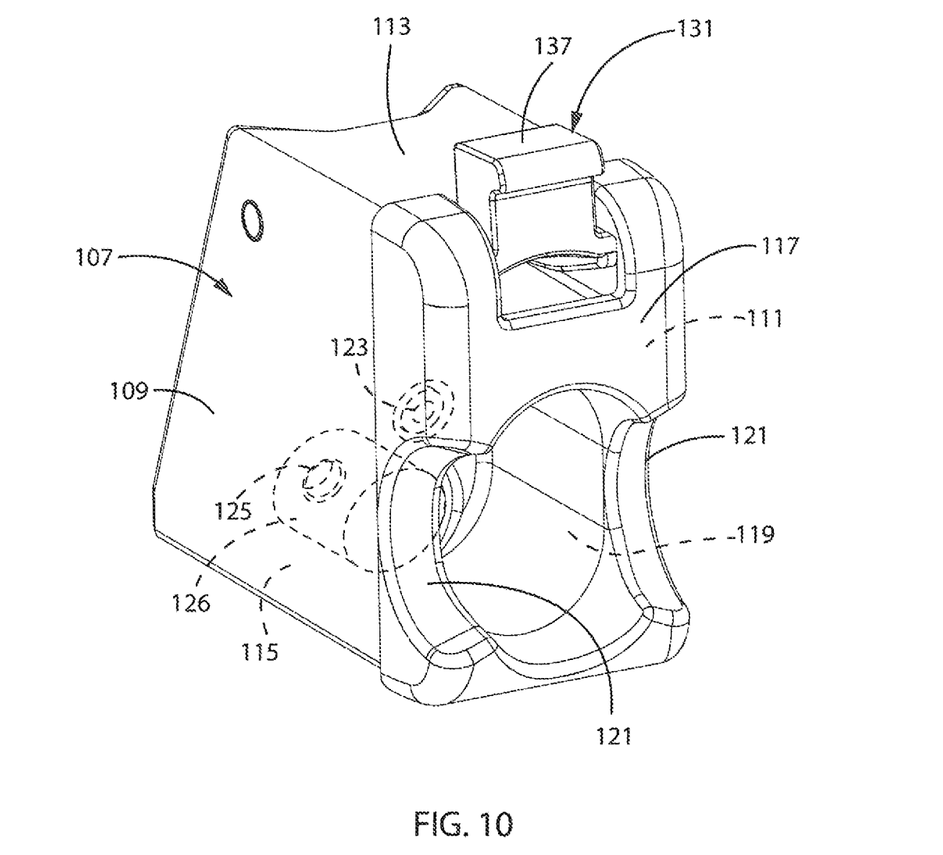
FIG. 10 is a front side perspective view of a lock enclosure of the lock arrangement of FIG. 9A.

Referring now to FIG. 10, the lock enclosure 107 includes interconnected side walls 109, 111, upper and lower walls 113, 115, and an outer wall 117. A socket 119 extends into the outer wall 117 and provides a recess configured to receive the lock mechanism 103 for storage within the lock enclosure 107. Openings 121 extend into the side walls 109, 111 to expose portions of the lock mechanism 103 to be grasped by fingers of a user when removing the cable segment 105a, 105b and the lock mechanism 103 from the main bar 15.

Figure 11:
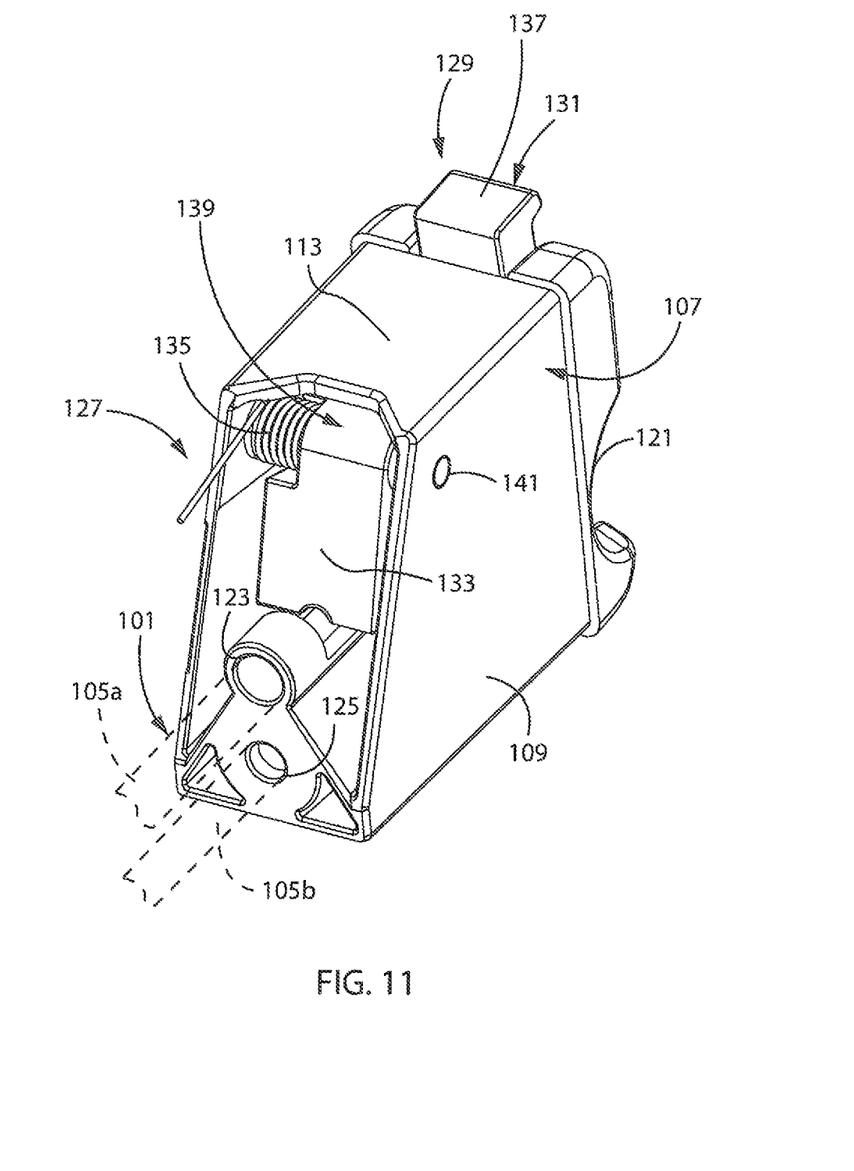
FIG. 11 is a back side perspective view of the lock enclosure of FIG. 10.

Referring now to FIG. 11, the lock enclosure 107 defines first and second passages 123, 125 at a back portion 127 of the lock enclosure 107 that is opposite a front portion 129. The first passage 123 is arranged so that the first cable segment 105a longitudinally advances through the first passage 123 when the cable segment 105a is being removed from storage inside the main bar 15. The second passage 125 is arranged so that the cable segment 105b longitudinally advances through the second passage 125 when the cable segment 105b is being removed from storage inside the main bar 15. The first and second passages 123, 125 have bores with inner diameters that are larger than outer diameters of the cable segments 105a, 105b and smaller that outer diameters of the cable caps 106c to anchor to and prevent complete withdrawal of the cable segments 105a, 105b from the main bar 15 by way of the lock enclosure 107. Referring again to FIG. 10, the second passage is connected to a counterbore 126 that extends as a depression from a back wall of the socket 119 inwardly to the main bar 15. The counterbore 126 is configured to receive and house the cable pin 106b for storage in the lock enclosure 107 behind the lock body 106a while preventing the cable pin 106b from passing through the second passage 125 further inside of the main bar 15. A lock release arrangement 131 is arranged at the lock enclosure 107 and is configured to selectively permit withdrawal of at least a portion of the cable arrangement 101 and also the lock mechanism 103 from storage inside of the main bar 15.

Referring again to FIG. 11, the lock release arrangement 131 includes a gate 133 configured to engage an outer surface of the cable segment 105a to prevent removal of the lock mechanism 103 and the cable segment 105a from storage inside of the main bar 15 in a resting state. A spring 135 biases the gate 133 against the cable segment 105a when the gate 133 is in the resting state. An actuator, in the form of a button 137, is arranged with respect to the gate 133 for moving the gate 133 to disengage the outer surface of the cable segment 105a. This allows removal of the lock mechanism 103 and the cable segment 105a from storage inside of the main bar 15. The gate 133 and button 137 may be arranged at the opposing ends of an L-shaped body 139 that is configured to pivot about a pin 141 that extends transversely through the lock enclosure 107. In this arrangement, the cable segment 105a can be freely fed through the lock enclosure 107 because pushing the cable segment 105a through the first passage 123 pushes the gate 133 to pivot about pin 141 to overcome the biasing force of spring 135 and move the gate 133 away from the passage 123. This allows the cable segment 105a to readily slide under the gate 133. However, trying to pull the cable segment 105a out of the main bar 15 without pushing the button 137 tends to pull the gate 133 into tighter engagement against the cable 101, preventing movement of the cable segment 105a. This allows for automatically locking the cable segment 105a and thus cable arrangement 101 and lock mechanism 103 inside of the main bar 15 for storage.

Referring now to FIGS. 9B and 11, the bicycle lock arrangement 99 is shown in FIG. 9B configured with the cable segments 105a, 105b held by two lock enclosures 107 at the two opposite ends of the main bar 15. Both of the cable segments 105a, 105b operably engage lock release arrangements 131 that selectively permit withdrawal of the cable segments 105a, 105b from the respective lock enclosures 107 at the ends of the main bar 15. In this configuration, each of the cable segments 105a, 105b can pass through the first passage 123 of its respective lock enclosure 107 to freely pass under the gate 133 when pushed into the main bar 15, and is prevented from withdrawal from the main bar 15 by the gate 133 when the button 137 is not pushed. As shown toward the left-hand side of FIG. 9B, the lock enclosure 107 that houses the cable pin 106b includes a plug 143 arranged in the socket 119 that substantially closes the outer opening of the socket 119. The plug 143 has a bore 145 through which the cable pin 106b and the cable segment 105b extend and that is aligned with the first passage 123.

Various alternatives and embodiments are contemplated as being within the scope of the following claims particularly pointing out and distinctly claiming the subject matter regarded as the invention.

I claim:

1. A bicycle carrier for carrying at least one bicycle on a motor vehicle, the bicycle carrier comprising:
   a main bar having first and second ends;
   a wheel support arranged with respect to the main bar to support a wheel of a bicycle;
   a retaining arm configured for retaining the wheel of the bicycle in a fixed position relative to the wheel support, the retaining arm having a first end defining a pivot axis of the retaining arm and a second end arranged to move with respect to the main bar to engage the wheel of the bicycle for retaining the wheel of the bicycle in a fixed position; and
   an arm locking arrangement arranged at the first end of the retaining arm and configured to allow free movement of the retaining arm in a first direction of travel about the pivot axis defining an unrestricted movement direction and to restrict movement of the retaining arm in a second, opposite direction of travel about the pivot axis defining a restricted movement, direction, wherein the arm locking arrangement includes an engagement mechanism movable between an engaged position and a disengaged position, wherein in the engaged position the engagement mechanism allows free movement of the retaining arm in the unrestricted movement direction and restricts movement of the retaining arm in the restricted movement direction, and in the disengaged position allows free movement of the retaining arm in both directions, and further includes a release mechanism carried by the retaining arm, wherein the release mechanism is configured to move the engagement mechanism between the engaged and disengaged positions.

2. The bicycle carrier of claim 1, wherein the engagement mechanism is configured to lock the retaining arm into multiple locked positions corresponding to positions defined by the retaining arm when the retaining arm stops movement in the unrestricted movement direction.

3. The bicycle carrier of claim 1, wherein the unrestricted movement direction is defined by movement of the second end of the retaining arm toward an intermediate section of the main bar.

4. The bicycle carrier of claim 1, wherein the restricted movement direction is defined by movement of the second end of the retaining arm away from an intermediate section of the main bar.

5. The bicycle carrier of claim 1, wherein the engagement mechanism includes a one-way mechanism configured to allow movement of the retaining arm in the unrestricted movement direction and prevent movement of the retaining arm in the restricted movement direction.

6. The bicycle carrier of claim 5, wherein the release mechanism is configured to release the one-way mechanism for allowing movement of the retaining arm in the restricted movement direction.

7. The bicycle carrier of claim 6, wherein the one-way mechanism includes a ratchet arrangement.

8. The bicycle carrier of claim 7, wherein the ratchet arrangement includes a toothed surface and a stop that includes an end configured to advance across the toothed surface when the retaining arm is moved in the unrestricted movement direction and to lock against the toothed surface to prevent movement of the retaining arm in the restricted movement direction.

9. The bicycle carrier of claim 8, wherein the release mechanism is arranged with respect to the stop for moving the stop to disengage from the toothed surface of the ratchet arrangement when the release mechanism positions the engagement mechanism in the disengaged position.

10. The bicycle carrier of claim 9, wherein the release mechanism includes a button carried by the retaining arm.

11. The bicycle carrier of claim 1, wherein the wheel support defines a wheel support of a first pair of aligned wheel supports arranged at a first side of the bicycle carrier, wherein a second pair of aligned wheel supports is arranged at a second side of the bicycle carrier, wherein the retaining arm defines a first retaining arm arranged at a first end of the bicycle carrier and a second retaining arm arranged at a second end of the bicycle carrier, wherein each of the first and second retaining arms is configured to engage respective wheels of bicycles supported by the first and second pairs of aligned wheel supports on the first and second sides of the bicycle carrier, respectively.

12. The bicycle carrier of claim 11, wherein the first arm locking arrangement is supported by a first bracket at the first end of the bicycle carrier and is arranged between respective wheel supports of the first and second pairs of wheel supports at the first end of the bicycle carrier.

13. The bicycle carrier of claim 11, wherein each of the first and second retaining arms includes a first hook extending in the direction of the first side of the bicycle carrier and a second hook extending in the direction of the second side of the bicycle carrier.

14. The bicycle carrier of claim 13, wherein a height adjustment arrangement is arranged with respect to each of the first and second hooks of each of the first and second arm locking arrangements and is configured for selectively adjusting a position of the corresponding hook relative to the respective one of the first and second arm locking arrangements.

15. The bicycle carrier of claim 14, wherein on each of the first and second arm locking arrangements, the first and second hooks are configured for height adjustment independent of one another.

16. A bicycle carrier for carrying at least one bicycle on a motor vehicle, the bicycle carrier comprising:
a main bar having first and second ends;
a wheel support arranged with respect to the main bar to support a wheel of a bicycle;
a retaining arm for retaining the wheel of the bicycle in a fixed position relative to the wheel support, the retaining arm having a first end defining a pivot axis of the retaining arm and a second end arranged to move with respect to the main bar to engage the wheel of the bicycle for retaining the wheel of the bicycle in a fixed position; and an arm locking arrangement arranged at the first end of the retaining arm and configured to allow free movement of the retaining arm in a first direction of travel about the pivot axis defining an unrestricted movement direction and to restrict movement of the retaining arm in a second, opposite direction of travel about the pivot axis defining a restricted movement direction, wherein the arm locking arrangement includes a ratchet arrangement configured to allow movement of the retaining arm in the unrestricted movement direction and prevent movement of the retaining arm in the restricted movement direction, wherein the ratchet arrangement includes a toothed surface and a stop that includes an end configured to advance across the toothed surface when the retaining arm is moved in the unrestricted movement direction and to lock against the toothed surface to prevent movement of the retaining arm in the restricted movement direction, and wherein the arm locking arrangement further includes a release mechanism configured to release the one-way mechanism for allowing movement of the retaining arm in the restricted movement direction, wherein the release mechanism is arranged with respect to the stop for moving the stop to disengage from the tooth surface of the ratchet arrangement, wherein the release mechanism includes a button arranged at the second end of the retaining arm.

17. The bicycle carrier of claim 16, wherein the release mechanism includes a link that interconnects the button and the stop.

18. A bicycle carrier for carrying at least one bicycle on a motor vehicle, the bicycle carrier comprising:
a main bar having first and second ends, wherein the main bar is configured for attachment to the motor vehicle and for supporting the at least one bicycle on the motor vehicle, and wherein the main bar defines an interior and wherein at least one of the ends of the main bar includes an opening in communication with the interior of the main bar;
a bicycle lock arrangement configured for locking a bicycle to the bicycle carrier, the bicycle lock arrangement including,
a cable arrangement configured for storage within the interior of the main bar, wherein the cable arrangement includes at least one cable;
a lock mechanism secured to the at least one cable and movable therewith, wherein the lock mechanism and the at least one cable are movable between a retracted storage position in which the at least one cable is positioned within the interior of the main bar and an extended operative position in which at least a portion of the at least one cable is withdrawn from the interior of the main bar; and
a lock enclosure positioned within the opening of the main bar, wherein the lock enclosure is configured for storing the lock mechanism with respect to the main bar when the lock mechanism and the at least one cable are in the retracted storage position.

19. The bicycle carrier of claim 18, wherein the cable arrangement comprises a pair of cables, each of which is configured for storage within the interior of the main bar when in the retracted storage position.

20. The bicycle carrier of claim 18, wherein the lock enclosure includes a lock release arrangement configured to selectively secure the lock mechanism to the lock enclosure and to selectively disengage the lock mechanism to permit movement of the lock mechanism away from the lock enclosure and withdrawal of at least a portion of the cable arrangement from the interior of the main bar.

21. The bicycle carrier of claim 20, wherein the lock enclosure includes a socket and the lock mechanism is configured to nest within the socket of the lock enclosure when the lock mechanism and the at least one cable are in the retracted stogie position.

22. The bicycle carrier of claim 20, wherein the lock enclosure defines a first passage through which a first segment of the cable arrangement is arranged to longitudinally advance and a second passage through which a second segment of the cable arrangement is arranged to longitudinally advance during movement of the at least one cable away from the retracted storage position toward the extended operative position.

23. The bicycle carrier of claim 18, wherein the at least one cable is withdrawn from the interior of the main bar by removal through a passage defined by the lock enclosure.

24. The bicycle carrier of claim 23, wherein the lock mechanism is secured to the at least one cable such that the lock mechanism is removed from the lock enclosure by moving in unison with the at least one cable during movement of the at least one cable from the retracted storage position to the extended operative position.

25. The bicycle carrier of claim 20, wherein the lock release arrangement includes a gate configured to engage an outer surface of the at least one cable to prevent movement of the lock mechanism and the at least one cable to the extended operative position.

26. A bicycle carrier for carrying at least one bicycle on a motor vehicle, the bicycle carrier comprising:
  a main bar having first and second ends;
  a bicycle lock arrangement configured for locking a bicycle to the bicycle carrier, the bicycle lock arrangement including,
    a cable arrangement configured for storage with respect to the main bar;
    a lock mechanism configured to selectively lock segments of the cable to each other, wherein each of the cable arrangement and the lock mechanism are configured for storage inside of the main bar;
    a lock enclosure arranged at at least one of the first and second ends of the main bar and configured for storing the lock mechanism with respect to the main bar; and
    a lock release arrangement configured to selectively permit withdrawal of at least a portion of the cable arrangement from storage inside of the main bar, wherein the at least a portion of the cable arrangement is withdrawn from storage inside of the main bar by removal through at least one of the first and second ends of the main bar, wherein the lock release arrangement includes a gate configured to engage an outer surface of the cable to prevent removal of the lock mechanism and the at least a portion of the cable arrangement from storage inside of the main bar, wherein the gate defines a resting state in which the gate is biased against the outer surface of the cable;
  wherein the lock mechanism is arranged with respect to the cable arrangement for removing the lock mechanism from the enclosure by moving in unison with the at least a portion of the cable arrangement during removal of the at least a portion of the cable arrangement out of the at least one of the first and second ends of the main bar.

27. The bicycle carrier of claim 26, wherein the lock release arrangement includes a button arranged with respect to the gate for moving the gate to disengage the outer surface of the cable arrangement for allowing removal of the lock mechanism and the at least a portion of the cable arrangement from storage inside of the main bar.

* * * * *

UNITED STATES PATENT AND TRADEMARK OFFICE
CERTIFICATE OF CORRECTION

| | | |
|---|---|---|
| PATENT NO. | : 9,649,986 B2 | Page 1 of 1 |
| APPLICATION NO. | : 14/487651 | |
| DATED | : May 16, 2017 | |
| INVENTOR(S) | : Fabio Pedrini | |

It is certified that error appears in the above-identified patent and that said Letters Patent is hereby corrected as shown below:

In the Claims

Claim 1, Column 10, Line 38, after "movement" delete ",";

Claim 16, Column 11, Line 61, after "arm" insert -- configured --.

Signed and Sealed this
Fourth Day of July, 2017

Joseph Matal
*Performing the Functions and Duties of the*
*Under Secretary of Commerce for Intellectual Property and*
*Director of the United States Patent and Trademark Office*